United States Patent [19]

Tuszynski et al.

[11] Patent Number: 4,725,569

[45] Date of Patent: Feb. 16, 1988

[54] ORGANOPOLYSULFIDE-IMPREGNATED CATALYST AND METHODS OF PREPARATION AND USE

[76] Inventors: William J. Tuszynski, 3 Evelyn La., Quakertown, Pa. 18951; Dennis R. Stevens, 2500 Salem Dr., Cinnaminson, N.J. 08077

[21] Appl. No.: 675,165

[22] Filed: Nov. 27, 1984

[51] Int. Cl.$^4$ .................. B01J 31/00; B01J 27/047; B01J 27/051; B01J 27/049

[52] U.S. Cl. .................................. 502/168; 502/219; 502/220; 502/221

[58] Field of Search ............... 502/168, 219, 220, 221

[56] References Cited

U.S. PATENT DOCUMENTS

| | | | |
|---|---|---|---|
| 2,402,626 | 6/1946 | Hawk | 502/220 |
| 3,016,347 | 1/1962 | O'Hara | 208/254 H |
| 3,132,086 | 5/1964 | Kelley et al. | 208/143 |
| 3,140,994 | 7/1964 | Derr, Jr. et al. | 208/254 H |
| 3,366,684 | 1/1968 | Budd | 502/168 X |
| 3,715,404 | 2/1973 | Lerdlar et al. | 502/168 X |
| 4,323,480 | 4/1982 | Diner et al. | 502/220 X |
| 4,443,330 | 4/1984 | Mongbri | 502/219 X |
| 4,474,896 | 10/1980 | Chao | 502/220 X |
| 4,530,917 | 7/1985 | Berrebi | 502/219 X |

OTHER PUBLICATIONS

Experience Reveal Test Presulfiding Techniques for HDS and HDN Catalyts, Hallie Ketjen Catalysts Amersfoort, The Netherlands, Oil and Gas Journal, Dec. 20, 1982, pp. 69–74.

Primary Examiner—Helen M. S. Sneed
Assistant Examiner—William G. Wright

[57] ABSTRACT

An organopolysulfide-impregnated catalyst composition usable to hydrotreat petroleum and other hydrocarbon feedstock is described. Also disclosed are processes for making and using the composition.

13 Claims, 1 Drawing Figure

ORGANOPOLYSULFIDE-IMPREGNATED CATALYST AND METHODS OF PREPARATION AND USE

BACKGROUND

In the refining of petroleum to yield usable products, an essential processing step is hydrotreating. The major purposes of hydrotreating include the conversion of organosulfur and organonitrogen compounds to $H_2S$ and $NH_3$, respectively, the removal of metals contained in the petroleum fraction, and the hydrogenation of olefins and occasionally aromatics. This step is carried out by reacting a petroleum fraction with hydrogen in the presence of a catalyst consisting of a group VIb metal such as Mo, sometimes promoted with group VIII metals, especially Co and/or Ni, on an inert support.

Hydrotreating catalysts are supplied as the metal oxides and ar presulfided to convert the metal oxides to their sulfides. Presulfiding is likewise required after air-regeneration of a hydrotreating catalyst (to remove coke), since this results in a reconversion of the metal sulfides to metal oxides. By presulfiding under carefully controlled conditions prior to hydrotreating, coke formation, which leads to catalyst deactivation, is minimized. Presulfiding is typically carried out by passing a mixture of hydrogen gas and either $H_2S$ or a labile organosulfur compound over the catalyst. Alternatively, it can be done by passing $H_2S$ or $CS_2$, in the absence of hydrogen gas, over the catalyst, followed by treatment with hydrogen gas. Appropriate labile organosulfur compounds include $CS_2$, dimethyl sulfide (DMS), dimethyl disulfide (DMDS), di-t-nonyl polysulfide (TNPS), or a lower-alkyl mercaptan such as ethyl mercaptan or butyl mercaptan. Such art has been described in U.S. Pat. Nos. 3,016,347, 3,132,086, and 3,140,994.

The methods currently practiced have been described by Hallie (*Oil and Gas Journal*, Dec. 20, 1982, pp. 69–74) and include vapor-phase and "spiked" liquid feed presulfiding. A "spiked" liquid feed consists of a paraffinic base such as kerosene to which the sulfiding agent has been added to give a solution typically containing 1-3 wt. % S. Each of these methods involves bringing the presulfiding agent(s) or feeds and hydrogen gas simultaneously into contact with the catalyst at elevated temperatures after it has been loaded into the hydrotreating reactor. Hallie teaches that spiked-feed presulfiding results in higher catalyst activity than vapor-phase presulfiding, but that the activity of the sulfided catalyst is independent of the choice of spiking agents listed in the above paragraph.

The present invention relates to an organosulfide-impregnated catalyst that can be made prior to its insertion in a hydrotreating reactor.

BRIEF SUMMARY OF THE INVENTION

The invention is an organopolysulfide-impregnated catalyst composition comprising:
(a) an inert support impregnated with an organopolysulfide compound in an amount sufficient to meet the stoichiometric requirement for conversion of group VIb and group VIII metal oxides on the support to their sulfide forms;
(b) one or more group VIb metal oxides on said inert support, the total amount of the group VIb metal oxides being 5 to 50% of the support/metal oxide weight; and
(c) optionally, in addition to said one or more group VIb metal oxides, one or more group VIII metal oxides on said inert support, the total amount of the grou VIII metal oxides being 2 to 20% of the support/metal oxide weight;
said organopolysulfide being a dialkyl polysulfide of the formula $$R(S)_xR^1$$ 

wherein R and $R^1$ are independently $C_1$–$C_{20}$ alkyl and x is in the range, 2 to 8, provided that
(1) R plus $R^1$ do not exceed $C_{30}$,
(2) if any group VIII metal oxide is on the inert support, then the total amount of group VIb metal oxides plus group VIII metal oxides does not exceed 50% of the support/metal oxide weight, and
(3) the composition has not been in contact with a reducing agent.

The invention is also a process for preparing an organopolysulfide-impregnated catalyst comprising the steps of:
(1) contacting a solution of an organopolysulfide compound in an inert solvent with an inert support on which one or more group VIb metal oxides and, optionally, one or more group VIII metal oxides are present, the total amount of the group VIb metal oxides being 5 to 50% of the support/metal oxide weight, and the total amount of group VIII metal oxides being 2 to 20% of the support/metal oxide weight, provided that if any group VIII metal oxides are present on the inert support, the total amount of group VIb metal oxides plus group VIII metal oxides does not exceed 50% of the support/metal oxide weight;
(2) removing excess solution from the support;
(3) drying the support;
said organopolysulfide compound being a dialkyl polysulfide of the formula $$R(S)_xR^1$$ 

wherein R and $R^1$ are independently $C_1$–$C_{20}$ alkyl and x is in the range, 2 to 8, provided that R plus $R_1$ do not exceed $C_{30}$, and provided that a reducing agent is not introduced into the process.

The invention is also the process of using an organopolysulfide-impregnated catalyst to hydrotreat petroleum or other hydrocarbon feedstock which process comprises the steps of:
(i) sulfiding an organopolysulfide-impregnated catalyst composition by contacting it with a reducing agent; and
(ii) contacting the resulting sulfided catalyst composition with petroleum or other hydrocarbon feedstock in the presence of hydrogen; said organopolysulfide-impregnated catalyst composition being defined above.

BRIEF DESCRIPTION OF THE DRAWINGS

A FIG. 1 showing the percentage thiophene conversion as a function of hydrotreating run time for a catalyst of the present invention and for a catalyst prepared according to prior art principles is included.

DETAILED DESCRIPTION

Figure 1:
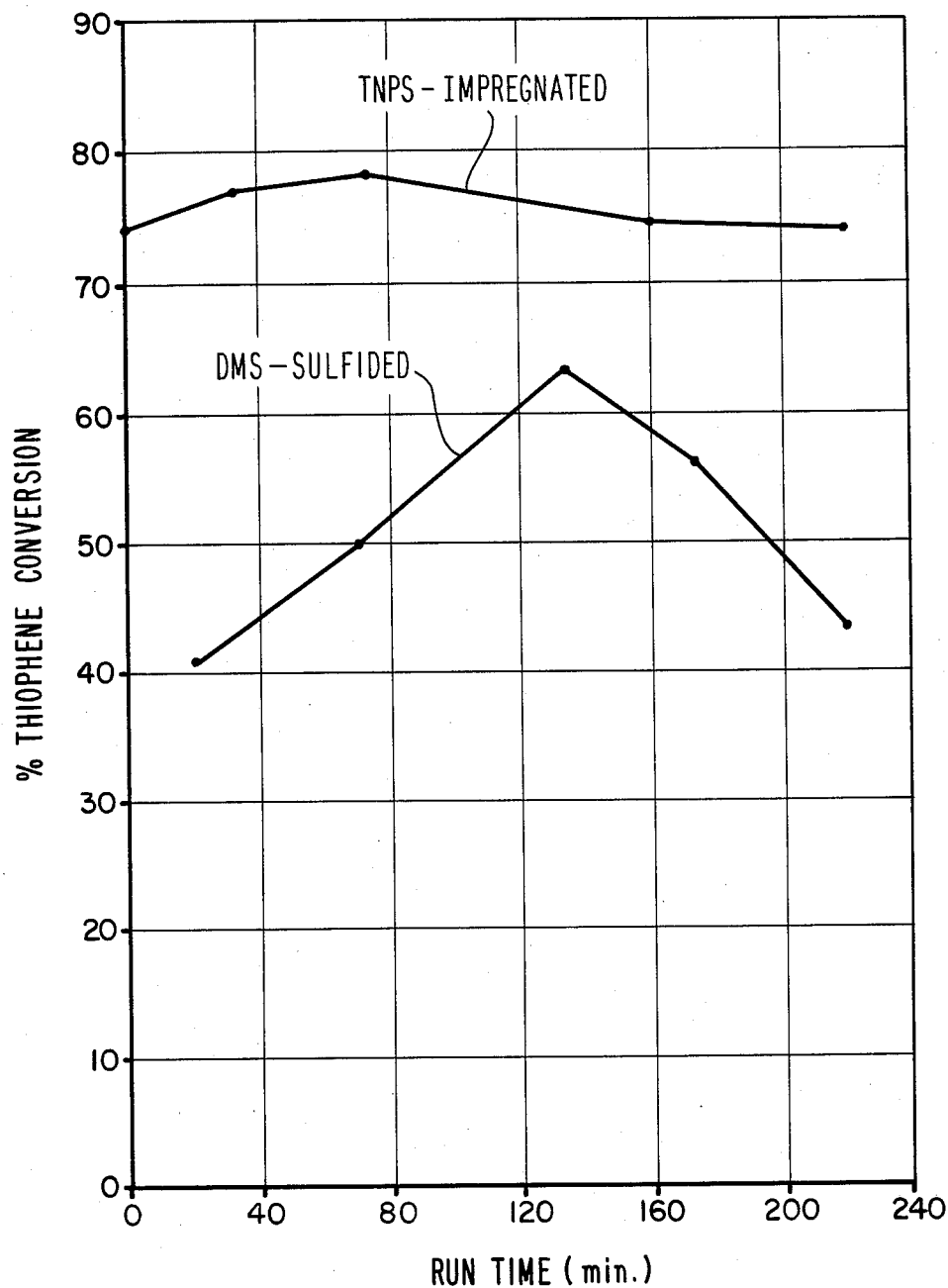

The present invention relates to an organosulfide-impregnated catalyst with surprisingly high activity that can be made prior to its insertion in a hydrotreating reactor. The impregnated catalyst is loaded into the reactor, where it is reacted with hydrogen gas to generate $H_2S$ in situ. The $H_2S$ and the excess hydrogen gas then react with the catalyst metal oxides to yield a sulfided catalyst.

Relationship of Invention to the Prior Art

The organosulfide-impregnated catalyst composition that is the subject of the present invention is referred to hereinafter as "the composition".

The composition, when activated to the sulfided state by exposure to hydrogen, unexpectedly shows a higher hydrodesulfurization activity than a catalyst constructed on principles taught by the prior art. [See Example 1 for details of a comparative experiment.]

The composition is, to Applicants' knowledge, also distinguished from the prior art in that the composition can be made prior to its insertion in a hydrotreating reactor, the reactor in which the composition will be used to hydrotreat petroleum or other hydrocarbon feedstock, and can subsequently operate effectively as a hydrotreating catalyst in such a reactor. The prior art, as illustrated by the above cited references, teaches that the catalyst is exposed to a sulfiding agent, such as an organopolysulfide compound, in the hydrotreating reactor.

Being able to impregnate the catalyst with an organosulfide compound prior to inserting it in a hydrotreating reactor has advantages. It has been common practice to store the sulfiding agent in rail cars or trucks while the presulfiding procedure is in progress. As delays due to reactor system breakdown and/or leakage have not been uncommon during the presulfiding process, the incurring of demurrage costs for the rail cars or trucks has not been uncommon.

The composition is further distinguished from the prior art in that it is made in the absence of hydrogen gas whereas, in the prior art, to Applicants' knowledge, the catalyst is exposed to hydrogen gas at the same time as it is exposed to the organopolysulfide compound. Exposure of the composition to hydrogen gas prior to its insertion in the reactor would result in its inactivation upon contact with air due to oxidation and hydrolysis.

The Composition

The organopolysulfide-impregnated catalyst composition comprises:
 (a) an inert support impregnated with an organopolysulfide compound in an amount sufficient to meet the stoichiometric requirement for conversion of group VIb and group VIII metal oxides on the support to their sulfide forms;
 (b) one or more group VIb metal oxides on said inert support, the total amount of the group VIb metal oxides being 5 to 50% of the support/metal oxide weight; and
 (c) optionally, in addition to said one or more group VIb metal oxides, one or more group VIII metal oxides on said inert support, the total amount of the group VIII metal oxides being 2 to 20% of the support/metal oxide weight;
said organopolysulfide compound being a dialkyl polysulfide of the formula $$R(S)_xR^1$$

wherein R and $R^1$ are independently $C_1$–$C_{20}$ alkyl and x is in the range, 2 to 8, provided that
 (1) R plus $R^1$ do not exceed $C_{30}$,
 (2) if any group VIII metal oxide is on the inert support, then the total amount of group VIb metal oxides plus group VIII metal oxides does not exceed 50% of the support/metal oxide weight, and
 (3) the composition has not been in contact with a reducing agent.

"$C_1$–$C_{20}$ alkyl" refers to an alkyl group with a straight or branched chain of 1 to 20 carbon atoms. "Provided that R plus $R^1$ do not exceeds $C_{30}$", means provided that the sum of the number of carbon atoms in R plus the number of carbon atoms in $R^1$ does not exceed 30. Generally, a given preparation of the organopolysulfide compound has a range of values of x. Therefore "the range, 2 to 8," for x means that the average value of x is between 2 and 8.

Inert supports containing group VIb and group VIII metal oxides are those of the type known in the art to be useable in the hydrotreatment of hydrocarbon feedstock including petroleum. Their inert component is preferably made of alumina and/or silica. They are exemplified by the Aero ® catalysts used in Examples 1 to 3.

The stoichiometric requirement for converting one mole of a metal oxide, in which M is the metal atom, to its sulfide form, $M_pS_q$, is q/p moles of sulfur. The stoichiometric requirement can be calculated from the manufacturer's specifications for its inert support containing metal oxides.

With some catalysts, no loss of activity may occur if somewhat less than the stoichiometric requirement is impregnated, because not all of the group VIb and group VIII metal oxides may be physically accessible to the sulfur atoms. In addition, impregnation of as much as two times the stoichiometric requirement is not expected to significantly diminish the catalystic activity.

The stoichiometric requirement for conversion of group VIb and group VIII metal oxides on the support to their sulfide forms is also referred to below by the abbreviation, "stoich. req." Values of the stoich. req. are expressed as the requirement for 100 g of catalyst where the catalyst weight is measured prior to impregnation.

The amount of sulfur impregnated per 100 g of catalyst, where the catalyst weight is measured prior to impregnation, is referred to by the abbreviation, "sulf. impreg." The amount of sulfur impregnated can be measured by any of several standard procedures.

Any of the group VIb metal oxides can be used.

The group VIII metal oxides are those used in the prior art when the presulfiding is achieved by simultaneous treatment of a metal-oxide containing support with hydrogen gas and either $H_2S$ or a labile organosulfide compound, and are preferably nickel oxide or a cobalt oxide (including cobalt molybdate).

The support/metal oxide weight is the combined weight of the inert support and any group VIb and group VIII metal oxides thereon.

When there is no group VIII metal oxide on the support, the total amount of group VIb metal oxides is in the range, 5 to 50% of the support/metal oxide weight. However, if there is any group VIII metal oxide on the support, the total amount (i.e. the combined weights) of group VIb and group VIII metal oxides does not exceed 50% of the support/metal oxide weight.

Included in the definition of "reducing agent" is hydrogen gas.

PREFERRED EMBODIMENTS OF THE COMPOSITION

The preferred embodiment of the composition is that wherein R plus $R^1$ are at least $C_6$. (i.e. the sum of the number of carbon atoms in R plus the number of carbon atoms in $R^1$ is at least four.)

The more preferred embodiment of the composition is the preferred embodiment wherein
 (a) the inert support is made of either $\gamma$-$Al_2O_3$, $SiO_2$ or both $\gamma$-$Al_2O_3$ and $SiO_2$;
 (b) either there is one group VIb metal oxide selected from the class of $MoO_3$ and $WO_3$ on said support or there are two group VIb metal oxides, $MoO_3$ and $WO_3$, on said support;
 (c) R and $R^1$ are independently $C_8$–$C_{12}$ alkyl; and
 (d) x is in the range, 3 to 6.

The even more preferred embodiment of the composition is the more preferred embodiment wherein there is a group VIII metal oxide on the inert support and the group VIII metal oxide is either CoO or NiO.

Still more preferred embodiments of the composition are the even more preferred embodiments wherein the alkyl groups of the organopolysulfide in the composition are tertiary alkyl.

The process of preparing the composition

The process for preparing an organopolysulfide-impregnated catalyst comprises the steps of:
 (1) contacting a solution of an organopolysulfide compound in an inert solvent with an inert support on which one or more group VIb metal oxides and, optionally, one or more group VIII metal oxides are present, the total amount of the group VIb metal oxides being 5 to 50% of the support/metal oxide weight, and the total amount of group VIII metal oxides being 2 to 20% of the support/metal oxide weight, provided that if any group VIII metal oxide is present on the inert support, the total amount of group VIb metal oxides plus group VIII metal oxides does not exceed 50% of the support/metal oxide weight;
 (2) removing excess solution from the support;
 (3) drying the support;
said organopolysulfide compound being a dialkyl polysulfide of the formula $$R(S)_xR^1$$

wherein R and $R^1$ are independently $C_1$–$C_{20}$ alkyl and x is in the range, 2 to 8, provided that R plus $R_1$ do not exceed $C_{30}$, and provided that no hydrogen gas is introduced into the process.

Preferred inert solvents are light aliphatic hydrocarbons such as hexane or naphtha. Preferred concentrations of the organopolysulfide in the solvent depend on which organopolysulfide is used, the nature of the inert support, and the stoich. req. of the catalyst, but are generally in the range 150 to 750 g of organopolysulfide per liter of solvent. The organosulfides are preferably contacted for 5 to 15 minutes at ambient temperatures (about 20° to 25° C.) and atmospheric pressure. Higher or lower temperatures are possible but ambient temperatures are most convenient. Contacting of organosulfides with the solvent has been done successfully for as little as 3 to 5 minutes and as much as 72 hours; shorter or longer time may also be possible. Within the range 3 minutes to 72 hours, the time of contacting has not been found to affect the amount of sulfur impregnated to a large extent. Variations in the amount of impregnated sulfur can be achieved by varying the concentration of the organopolysulfide in the solvent.

Contacting of the solution with the support can be accomplished by immersing the support in the solution. Removal of the excess solution can be done by decanting it. The support can then be air-dried. As the organopolysulfide compounds wherein R plus $R^1$ are less than $C_6$ are relatively volatile and may be toxic, catalyst compositions wherein such organopolysulfides are used are stored in closed containers until use.

Preferred embodiments of the process are those that result in the formation of the preferred, more preferred, even more preferred, and still more preferred compositions described above.

The process of using the composition

The process of using an organopolysulfide-impregnated catalyst to hydrotreat petroleum or other hydrocarbon feedstock comprises the steps of:
 (i) sulfiding an organopolysulfide-impregnated catalyst composition by contacting it with a reducing agent; and
 (ii) contacting the resulting sulfided catalyst composition with petroleum or other hydrocarbon feedstock in the presence of hydrogen;
said organopolysulfide-impregnated catalyst composition being defined above.

Preferred embodiments of the process of using the organopolysulfide-impregnated catalyst are those that utilize the preferred, more preferred, even more preferred, and still more preferred compositions described above.

The preferred reducing agent is hydrogen gas.

Conversion of the organopolysulfide catalyst to the sulfided state is accomplished by loading the impregnated catalyst in a hydrotreating reactor and passing a reducing agent, preferably hydrogen gas, over the catalyst at elevated pressure (up to 2500 psig but preferably 250 to 1500 psig) while raising the temperature of the reactor bed until the onset of the exothermic sulfiding reaction. Typically the initiation temperature will fall in the range, 50° C. to 150° C. After the onset of the reaction, the heat input into the reacto is controlled such that the bed temperature does not exceed a value which would lead to damage to the catalyst. Typical values of the maximum bed temperature would be 275 to 300° C., the exact value depending on the specific nature of the catalyst.

The conditions for the use of the composition after conversion to the sulfide state are the same as those used in the prior art when the presulfiding is achieved by simultaneous treatment of a metal oxide-containing support with hydrogen gas and either $H_2S$ or a labile organosulfide compound.

EXAMPLES

The properties of the commercial catalysts used in the examples are summarized in Table 1.

TABLE 1
Properties of Selected Commercial Hydrotreating Catalysts[a]

| Catalyst | Composition (by wt) % $MoO_3$ | % NiO | % CoO | Avg. Dia (in) | Avg. Length (in) | Surface Area ($m^2/g$) | Pore Vol. (ml/g) |
|---|---|---|---|---|---|---|---|
| HDS-9[b] | 17.5 | 3.2 | — | 0.12 | 0.14 | 170 | 0.52 |
| HDN-30 (1.6[c]) | 20.5 | 5.0 | — | 0.05[d] | 0.15 | 160 | 0.44 |
| HDS-2[b] | 15.4 | — | 3.2 | 0.123 | 0.22 | 310 | 0.75 |
| HDS-20A[c] | 16.2 | — | 5.0 | 0.051[d] | 0.16 | 230 | 0.52 |

[a]As per manufacturer's data
[b]Cyclindrical shape
[c]Trilobe ® catalyst
[d]Diameter across two lobes

EXAMPLE 1

Aero®-Trilobe®-HDS-20A (American Cyanamid) CoMo/$Al_2O_3$ hydrotreating catalyst (300 g) was charged into a 4-L Erlenmeyer flask, and 3 L of a hexane solution of TNPS (x equal to 4.5) containing 400 g of TNPS/L was added. After a 12-minute impregnation period at room temperature, excess impregnating solution was decanted and the catalyst was air-dried to give a free-flowing solid which assayed at 7.88% S (equivalent to 9.75 gS/100 g catalyst). In this catalyst, the stoichiometric sulfur requirement for converting the group VIb and group VIII metal oxides to their sulfide form, is 9.1 gS/100 g catalyst.

A 100 g sample of the impregnated catalyst was loaded into a Berty gradientless reactor (Autoclave Engineers). The catalyst was converted to its sulfided form by flowing hydrogen (1500 sccm at 240 psig) over it as the temperature was raised from ambient to 275° C. over a 4.5 hour period and held at 275° C. for 3 hr.

The hydrodesulfurization activity of the sulfided catalyst was tested by measuring thiophene conversion when a solution of 10% (vol) thiophene in 10% methylcyclohexane and 80% cyclohexane was passed through the reactor. Reaction conditions were: temperature, 275° C.; pressure, 240 psig; $H_2$ rate, 425 scc/mL thiophene solution; residence time ($t_{res}$) 16 sec. The results are shown as a function of "run time", the time that thiophene solution has been passing through the reactor, by the "TNPS-impregnated" curve in FIG. 1. The "% Thiophene Conversion" in FIG. 1 is 100 times $(A-B)/A$ where A is the amount of thiophene in the solution before passage of the solution over the catalyst and B is the amount of thiophene in the solution after passage of the solution over the catalyst, and both A and B are based on chromatographic analysis of the amount of thiophene in the solution. The "Thiophene Conversion" is a measure of the percentage of thiophene converted to its $H_2S$ and hydrocarbon products.

For comparison, 100 g of virgin Aero®-Trilobe®-HDS-20A catalyst was sulfided with DMS in a manner taught by the prior art. DMS was fed as a solution in cyclohexane containing 4.5% DMS by volume, which corresponds to a sulfur concentration of 2.5% by weight. The solution feed rate was 6 mL/min. Hydrogen gas was fed simultaneously at 1730 sccm (280 scc/mL liquid feed). The system pressure was held constant at 240 psig while the catalyst bed temperature was raised from 220° C. to 275° C. over the course of the sulfiding procedure, which required 4.7 hours. A total of 3.65 times the stoichiometric requirement of sulfur was used.

The thiophene hydrodesulfurization activity of the DMS-sulfided catalyst was measured under the same conditions as described above for the TNPS-impregnated catalyst except that $t_{res}$ was 20 seconds. The results are summarized by the "DMS-sulfided" curve in FIG. 1.

It is evident from the results in FIG. 1 that the impregnated catalyst unexpectedly shows higher hydrodesulfurizing activity than the DMS-sulfided catalyst.

EXAMPLE 2

A second commercial CoMo/$Al_2O_3$ catalyst, Aero®-HDS-2, and two NiMo/$Al_2O_3$ catalysts, Aero®-HDS-9 and Aero®-Trilobe-HDN-30 were charged at ambient temperature for 10 min with a hexane solution of TNPS at concentrations of 400 g to 600 g/liter. Twenty ml of TPNS-hexane solution was added per gram of catalyst during the charging procedure. The results are summarized in Table 2 below.

TABLE 2
Impregnation of Commercial Hydrotreating Catalysts[1]

| Catalyst | TNPS Conc (g/L) | Sulf. impreg. (gs/100 g cat) | Stoich. req. (gs/100 g cat) |
|---|---|---|---|
| HDS-2 (CoMo) | 400 | 9.48 | 8.0 |
| HDS-9 (NiMo) | 600 | 9.17 | 8.7 |
| HDN-30 (1.6) (NiMo) | 600 | 11.77 | 10.5 |

[1]All catalysts were Aero ® catalysts manufactured by American Cyanamid Corp. "Sulf. impreg." and "Stoich. req." are defined in the text of the Specification.

EXAMPLE 3

An Aero®-Trilobe®-HDS-20A catalyst was impregnated for 20 min. at ambient temperature with 250 ml of 500 g/L solution of di-t-butyl polysulfide (x equal to 5.3) in hexane. After decanting the liquid and air-drying the wet solid, the resulting air-dried catalyst contained 18.8 gS/100 g catalyst. The stoich. req. of the catalyst was 9.1 gs/100 g catalyst.

What is claimed is:
1. An organopolysulfide-impregnated catalyst composition comprising:
   (a) an inert support impregnated with an organopolysulfide compound in an amount sufficient to meet the stoichiometric requirement for conversion of group VIb and group VIII metal oxides on the support to their sulfide forms; and
   (b) one or more group VIb metal oxides on said inert support, the total amount of the group VIb metal oxides being 5 to 50% of the support/metal oxide weight;

said organopolysulfide being a dialkyl polysulfide of the formula $$R(S)_xR^1$$

wherein R and $R^1$ are independently $C_1$–$C_{20}$ alkyl and x is in the range, 2 to 8, provided that
   (1) R plus $R^1$ do not exceed $C_{30}$, (2) if any group VIII metal oxide is on the inert support, then the total amount of group VIb metal oxides plus group VIII metal oxides does not exceed 50% of the support/metal oxide weight, and (3) the composition has not been in contact with a reducing agent.

2. The composition of claim 1 wherein R plus $R^1$ are at least $C_6$.

3. The composition of claim 2 wherein
   (a) the inert support is made of either $\gamma$-$Al_2O_3$, $SiO_2$ or both $\gamma$-$Al_2O_3$ and $SiO_2$;
   (b) either there is one group VIb metal oxide selected from the class of $MoO_3$ and $WO_3$ on said support or there are two group VIb metal oxides, $MoO_3$ and $WO_3$, on said support;
   (c) R and $R_1$ are independently $C_8$–$C_{12}$ alkyl; and
   (d) x is in the range, 3 to 6.

4. The composition of claim 3 wherein the alkyl groups of the organopolysulfide are tertiary alkyl.

5. The composition of claim 3 wherein the alkyl groups of the organopolysulfide are tertiary alkyl.

6. The composition of claim 5 wherein the organopolysulfide is di-t-nonyl polysulfide.

7. The composition of claim 2 wherein the organopolysulfide if di-t-nonyl polysulfide.

8. An organosulfide-impregnated catalyst composition comprising:
   (a) an inert support impregnated with an organopolysulfide compound in an amount sufficient to meet the stoichiometric requirement for conversion of group VIb and group VIII metal oxides on the support to their sulfide forms;
   (b) one or more group VIb metal oxides on said inert support, the total amount of the group VIb metal oxides being 5 to 50% of the support metal oxide weight; and
   (c) one or more group VIII metal oxides on said inert support, the total amount of the group VIII metal oxides being 2 to 20% of the support/metal oxide weight;

said organopolysulfide being a dialkyl polysulfide of the formula $R(S)_xR^1$ wherein R and $R^1$ are independently $C_1$–$C_{20}$ alkyl and x is in the range, 2 to 8, provided that (1) R plus $R^1$ do not exceed $C_{30}$, (2) if any group VIII metal oxide is on the inert support, then the total amount of group VIb metal oxides plus group VIII metal oxides does not exceed 50% of the support/metal oxide weight, and (3) the composition has not been in contact with a reducing agent.

9. The composition of claim 8 wherein R plus $R^1$ are at least $C_6$.

10. The composition of claim 9 wherein
    (a) the inert support is made of either $\gamma$-$Al_2O_3$, $SiO_2$ or both $\gamma$-$Al_2O_3$ and $SiO_2$;
    (b) either there is one group VIb metal oxide selected from the class of $MoO_3$ and $WO_3$ on said support or there are two group VIb metal oxides, $MoO_3$ and $WO_3$, on said support;
    (c) R and $R_1$ are independently $C_8$–$C_{12}$ alkyl; and
    (d) x is in the range, 3 to 6.

11. The composition of claim 10 wherein there are one or more group VIII metal oxides on the inert support, said group VIII metal oxide(s) being selected from the group, CoO and NiO.

12. The composition of claim 10 wherein the alkyl groups of the organopolysulfide are tertiary alkyl.

13. The composition of claim 11 wherein the alkyl groups of the organopolysulfide are tertiary alkyl.

* * * * *